(12) United States Patent
Poole et al.

(10) Patent No.: US 8,845,873 B2
(45) Date of Patent: Sep. 30, 2014

(54) NEAR NEUTRAL BUOYANCY TEXTURE ADDITIVE FOR ELECTRODEPOSITABLE COATING COMPOSITIONS AND ASSOCIATED METHODS FOR FORMING TEXTURED COATED SUBSTRATES

(75) Inventors: James E. Poole, Gibsonia, PA (US); Richard F. Syput, Lower Burrell, PA (US); Roy E. Dean, Natrona Heights, PA (US); Michael J. Pawlik, Glenshaw, PA (US); Edward E. Abbott, Canandaigua, NY (US); Joseph T. Valko, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 45 days.

(21) Appl. No.: 13/249,772

(22) Filed: Sep. 30, 2011

(65) Prior Publication Data

US 2013/0084425 A1    Apr. 4, 2013

(51) Int. Cl.
| | | |
|---|---|---|
| *C25D 13/10* | (2006.01) | |
| *C09D 5/44* | (2006.01) | |
| *C25D 13/04* | (2006.01) | |
| *C25D 13/22* | (2006.01) | |

(52) U.S. Cl.
CPC ............. *C09D 5/4476* (2013.01); *C25D 13/04* (2013.01); *C25D 13/22* (2013.01)
USPC ........... 204/507; 428/141; 204/508; 204/471; 204/489; 204/509; 204/475

(58) Field of Classification Search
None
See application file for complete search history.

(56) References Cited

U.S. PATENT DOCUMENTS

| | | |
|---|---|---|
| 2,707,405 A | 5/1955 | Forster |
| 3,455,806 A | 7/1969 | Spoor et al. |
| 3,663,389 A | 5/1972 | Koral et al. |
| 3,749,657 A | 7/1973 | Bras et al. |
| 3,793,278 A | 2/1974 | De Bona |
| 3,928,157 A | 12/1975 | Suematsu et al. |
| 3,947,338 A | 3/1976 | Jerabek et al. |
| 3,947,339 A | 3/1976 | Jerabek et al. |
| 3,962,165 A | 6/1976 | Bosso et al. |
| 3,975,346 A | 8/1976 | Bosso et al. |
| 3,984,299 A | 10/1976 | Jerabek |
| 3,984,922 A | 10/1976 | Rosen |
| 4,001,101 A | 1/1977 | Bosso et al. |
| 4,007,154 A | 2/1977 | Schimmel et al. |
| 4,116,900 A | 9/1978 | Belanger |
| 4,134,866 A | 1/1979 | Tominaga et al. |
| 4,134,932 A | 1/1979 | Kempter et al. |
| 6,875,800 B2 | 4/2005 | Vanier et al. |
| 6,894,086 B2 | 5/2005 | Munro et al. |
| 6,896,934 B2 * | 5/2005 | Aronica et al. ............... 427/475 |
| 7,438,972 B2 | 10/2008 | Faler et al. |
| 7,605,194 B2 | 10/2009 | Ferencz et al. |
| 2005/0249939 A1 * | 11/2005 | Barkac et al. ................. 428/323 |
| 2006/0014099 A1 | 1/2006 | Faler et al. |
| 2010/0181198 A1 * | 7/2010 | Hickenboth et al. .......... 204/471 |

FOREIGN PATENT DOCUMENTS

| | | | |
|---|---|---|---|
| EP | 0012463 | 6/1980 | |
| EP | 826749 A2 * | 3/1998 | ............... C09D 5/44 |

OTHER PUBLICATIONS

U.S. Appl. No. 13/005,569, filed Jan. 13, 2011; Resinous Dispersions Including an Epoxy Amine Adduct for Flatting and Related Electrodepositable Coating Compositions; First Named Inventor: Joseph T. Valko, Pittsburgh, Pennsylvania.

* cited by examiner

*Primary Examiner* — Aaron Austin
*Assistant Examiner* — Jasper Saberi
(74) *Attorney, Agent, or Firm* — Alicia M. Passerin

(57) ABSTRACT

Disclosed herein are electrodepositable coating compositions comprising a film forming resin and a textured additive, wherein the textured additive has a density (specific gravity) of no more than 4.5 g/cc and a melting point greater than the curing temperature of the electrodepositable coating composition. Also described are coated substrates having a cured coating layer comprising the electrodepositable coating composition, wherein the cured film layer has a texture of at least 250µ-in as measured by a profilometer at conventional cured film thicknesses.

14 Claims, No Drawings

NEAR NEUTRAL BUOYANCY TEXTURE ADDITIVE FOR ELECTRODEPOSITABLE COATING COMPOSITIONS AND ASSOCIATED METHODS FOR FORMING TEXTURED COATED SUBSTRATES

STATEMENT REGARDING FEDERALLY SPONSORED RESEARCH

This invention was made with Government support under Contract No. W15QKN-07-C-0048 awarded by the ARDEC. The United States Government may have certain rights in this invention.

FIELD OF THE INVENTION

The present invention relates to resinous dispersions, coating compositions, multi-component composite coatings, and related coated substrates.

BACKGROUND INFORMATION

Electrodeposition as a coating application method involves the deposition onto a conductive substrate of a film-forming composition under the influence of an applied electrical potential. Electrodeposition has gained popularity in the coatings industry because it provides higher paint utilization, outstanding corrosion resistance, and low environmental contamination as compared with non-electrophoretic coating methods. Both cationic and anionic electrodepositions are used commercially, with cationic being more prevalent in applications desiring a high level of corrosion protection. Anionic electrodeposition is typically used for decorative applications, particularly where low cost and decorative qualities such as gloss and color are desired. Electrodepositable cationic acrylic vehicles with optional minor amounts of cationic epoxy may be used for applications in which both decorative and anti-corrosion properties are desirable.

There are a number of applications in which it is desired to provide texture to a coating layer applied by electrodeposition, in addition to the decorative and anti-corrosion properties described above. For example, it is highly desirable to provide texture in certain military applications, such as for use in munitions applications that require handling by soldiers, such as for hand grenades. In certain of these applications, it is also desirable that the textured coatings are low gloss or have reduced gloss.

SUMMARY OF THE INVENTION

One exemplary embodiment of the present invention discloses a method for forming a textured coating on a substrate comprising electrodepositing an electrodepositable coating composition onto said substrate to form a coating layer, said electrodepositable coating composition comprising a textured additive and a film forming resin, wherein the textured additive has a density (specific gravity) of no more than 4.5 g/cc and a melting point greater than a curing temperature of said electrodepositable coating composition; and thermally curing said coating layer at said curing temperature onto the substrate to form the textured coating layer, wherein the textured coating layer has a degree of texture of at least 250μ-in on at least one coated surface as measured by a profilometer.

Another exemplary embodiment of the present invention discloses an electrodepositable coating composition comprising a film forming polymer and a textured additive, wherein said textured additive has a density that is less than 4.5 g/cc and a melting point that is greater than the curing temperature of the electrodepositable coating composition.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As used herein, the term "cure" as used in connection with a composition, e.g., "composition when cured" or a "cured composition", or a "cured film", shall mean that any crosslinkable components of the composition are at least partially crosslinked. In certain embodiments of the present invention, the crosslink density of the crosslinkable components, i.e., the degree of crosslinking, ranges from 5% to 100% of complete crosslinking. In other embodiments, the crosslink density ranges from 35% to 85% of full crosslinking. In other embodiments, the crosslink density ranges from 50% to 85% of full crosslinking. One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network. In an embodiment of the present invention, the sufficiency of cure is evaluated relative to the solvent resistance of the cured film. For example, solvent resistance can be measured by determining the number of double acetone rubs. For purposes of the present invention, a coating is deemed to be "cured" when the film can withstand a minimum of 100 double acetone rubs without substantial softening of the film and no removal of the film.

The present invention is directed to a cured coated substrate having an electrodepositable coating composition deposited thereon. The cured electrodeposited coating layer has a desired degree of texture, or surface roughness, on each of its coated surfaces at a particular film thickness. This degree of texture is measured through the use of a profilometer, here a Taylor Hobson Surtronic 25™ compact surface texture measuring instrument, and is expressed as the change of texture (measured in $\mu$-in.) as compared with a perfectly smooth coating.

As will be discussed in detail below, in certain embodiments, the electrodepositable coating composition comprises a textured additive and a film forming resin.

The present invention can find particular use for coating multiple sides of a complex shaped part or article (i.e. a part or article that is not flat, or multi-sided part) in a single electrodeposition application step, wherein each of the coated sides, after cure, has a similar desired texture effect. Thus, for example, a multi-shaped part (such as an L-shaped part) with horizontal and vertical surfaces may be coated in a single-stage conventional electrodeposition bath to provide a cured coating layer that has a degree of texture of at least 250$\mu$-in on one coated surface, and in certain embodiments have an average degree of texture of at least 250$\mu$-in. on all of the coated surfaces.

In certain other embodiments of the present invention, the cured electrodeposited coating layer may also have 60° gloss readings of 3 or less (i.e. a reduced-gloss appearance or "flatting effect") on all its coated surfaces in addition to the desired textured effect, regardless of their orientation while being coated in the electrodeposition bath, without the use of traditional flatting pigments such as silicas and alumina silicas.

One exemplary application is for military applications, wherein texture and the optionally low-gloss finishes are highly desirable for munitions and for many military vehicles. Munitions, as defined herein, is used in the broadest sense of the term to cover anything that can be used in combat that includes but is not limited to hand grenades, bombs, missiles, warheads, and mines. Military vehicles may include, but are not limited to, land, combat and transportation vehicles.

Suitable substrates that can be cleaned and coated in accordance with the present invention include, without limitation, metal substrates, metal alloy substrates, and/or substrates that have been metallized, such as nickel plated plastic. In some embodiments, the metal or metal alloy can be aluminum and/or steel. For example, the steel substrate could be cold rolled steel, electrogalvanized steel, and hot dipped galvanized steel.

In certain embodiments, the cleaned substrates may then be contacted with a pretreatment composition prior to application of the electrodepositable coating composition. As used herein, the term "pretreatment composition" is often interchangeably used with the "conversion coating" and refers to a composition that, upon contact with a substrate, reacts with and chemically alters the substrate surface and binds to it to form a protective layer. The pretreatment composition are typically used on substrates for corrosion resistance, lubricity, or as a foundation for subsequent coatings or painting. The pretreatment compositions that may be used on the substrates in accordance with the present invention are conventional in nature. Suitable exemplary pretreatment compositions include, for example, zinc or zirconium-containing phosphate coatings.

As previously indicated, in certain embodiments, the substrate is contacted with a coating composition comprising a textured additive and a film-forming resin by an electrocoating step wherein an electrodepositable composition is deposited onto the metal substrate by electrodeposition. In the process of electrodeposition, the metal substrate being treated, serving as an electrode, and an electrically conductive counter electrode are placed in contact with an ionic, electrodepositable composition. Upon passage of an electric current between the electrode and counter electrode while they are in contact with the electrodepositable composition, an adherent film of the electrodepositable composition will deposit in a substantially continuous manner on the metal substrate. After deposition, the coating is cured via a curing operation. The heating or curing operation is often carried out at a temperature in the range of from 120 to 250° C., such as from 120 to 190° C., for a period of time ranging from 10 to 60 minutes.

Electrodeposition is usually carried out at a constant voltage in the range of from 1 volt to several thousand volts, typically between 50 and 500 volts. Current density is usually between 1.0 ampere and 15 amperes per square foot (10.8 to 161.5 amperes per square meter) and tends to decrease quickly during the electrodeposition process, indicating formation of a continuous self-insulating film. The film generated, as noted above, has a desired degree of texture that can be measured through the use of a profilometer.

In certain embodiments, the textured additive comprises a substance or compound that has a density (i.e. specific gravity) of no more than about 4.5 g/cc. In other words, the textured additive attains near neutral buoyancy in the electrodepositable coating composition. In addition, the textured additive has a melting point that is greater than the curing temperature of the electrodepositable coating composition in which it is utilized. In this way, the textured additive will remain intact (i.e. does not melt) during the heating or curing step and thus provide the degree of texture to the cured and deposited film as noted above.

Exemplary textured additives having a density of no more than about 4.5 g/cc and a melting point above the curing temperature of the electrodepositable coating composition (i.e. above 150° C., such as 250° C. for a typical cationic electrodepositable coating composition) that may be used in the present invention include but are not limited to nylon, ceramic microspheres (including very fine particle size (as fine as 4 microns average particle size), very high strength (60,000 psi compressive strength), hard, inert ceramic microspheres sold under the designation Zeeospheres™ by Zeeospheres Ceramics, LLC of Lockport, La.), recycled vulcanized rubber, alumina, silicon carbide, or mixtures thereof.

The amount of textured additive added to the electrodepositable bath, in certain embodiments, is sufficient to provide a particular degree of texture to the cured electrodeposited film. In certain embodiments, the desired degree of texture is at least 250$\mu$-in. on at least one coated surface, as measured by a profilometer. In other embodiments, the average degree of texture on all coated surfaces, regardless of orientation within the bath when coated (such as horizontal or vertical) is at least 250$\mu$-in as measured by a profilometer.

In certain of these embodiments, the amount of texture additive introduced to the electrodepositable coating composition to achieve the desired degree of texture comprises at least 0.4 weight percent, such as between 0.4 and 5.0 weight percent, such as between 1.6 and 2.5 weight percent, based on the total weight of the electrodepositable coating composition. In other embodiments, the amount of texture additive introduced to the electrodepositable coating composition to achieve the desired degree of texture comprises at least 0.5 weight percent, such as between 0.5 and 20 weight percent, such as between 2 and 10 weight percent, based on the total weight of the pigment paste (described below) that comprises a portion of the electrodepositable coating composition.

The textured additive may be added to the electrodepositable coating composition in any number of ways. In certain embodiments, the textured additive is added as an individual component to the electrodeposition bath under agitation using a Cowles Blade. In certain other embodiments, the textured additive may first be introduced to the Pigment Paste or to the resinous dispersion and then subsequently introduced to the electrodepositable coating composition. In other embodiments, it may be added to more than one portion of the electrodepositable coating composition.

As used herein, the term "film-forming resin" refers to resins that can form a self-supporting continuous film on at least a horizontal surface of a substrate upon removal of any diluents or carriers present in the composition or upon curing at ambient or elevated temperature. Conventional film-forming resins that may be used include, without limitation, those typically used in automotive OEM coating compositions, automotive refinish coating compositions, industrial coating compositions, architectural coating compositions, coil coating compositions, and aerospace coating compositions, among others.

In certain embodiments, the coating composition comprises a thermosetting film-forming resin. As used herein, the term "thermosetting" refers to resins that "set" irreversibly upon curing or crosslinking, wherein the polymer chains of the polymeric components are joined together by covalent bonds. This property is usually associated with a cross-linking reaction of the composition constituents often induced, for example, by heat or radiation. Curing or crosslinking reactions also may be carried out under ambient conditions. Once cured or crosslinked, a thermosetting resin will not melt upon the application of heat and is insoluble in solvents. In other embodiments, the coating composition comprises a thermoplastic film-forming resin. As used herein, the term "thermoplastic" refers to resins that comprise polymeric components that are not joined by covalent bonds and thereby can undergo liquid flow upon heating and are soluble in solvents.

The electrodepositable composition utilized in certain embodiments of the present invention often comprises, in addition to the textured additive, a resinous phase dispersed in an aqueous medium wherein the resinous phase comprises: (a) an active hydrogen group-containing ionic electrodepositable resin, and (b) a curing agent having functional groups reactive with the active hydrogen groups of (a).

In certain embodiments, the electrodepositable compositions utilized in certain embodiments of the present invention contain, as a main film-forming polymer, an active hydrogen-containing ionic, often cationic, electrodepositable resin. A wide variety of electrodepositable film-forming resins are known and can be used in the present invention so long as the polymers are "water dispersible," i.e., adapted to be solubilized, dispersed or emulsified in water. The water dispersible polymer is ionic in nature, that is, the polymer will contain anionic functional groups to impart a negative charge or, as is often preferred, cationic functional groups to impart a positive charge.

Examples of film-forming resins suitable for use in anionic electrodepositable compositions are base-solubilized, carboxylic acid containing polymers, such as the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the at least partially neutralized interpolymers of hydroxy-alkyl esters of unsaturated carboxylic acids, unsaturated carboxylic acid and at least one other ethylenically unsaturated monomer. Still another suitable electrodepositable film-forming resin comprises an alkyd-aminoplast vehicle, i.e., a vehicle containing an alkyd resin and an amine-aldehyde resin. Yet another anionic electrodepositable resin composition comprises mixed esters of a resinous polyol, such as is described in U.S. Pat. No. 3,749,657 at col. 9, lines 1 to 75 and col. 10, lines 1 to 13, the cited portion of which being incorporated herein by reference. Other acid functional polymers can also be used, such as phosphatized polyepoxide or phosphatized acrylic polymers as are known to those skilled in the art.

As aforementioned, it is often desirable that the active hydrogen-containing ionic electrodepositable resin (a) is cationic and capable of deposition on a cathode. Examples of such cationic film-forming resins include amine salt group-containing resins, such as the acid-solubilized reaction products of polyepoxides and primary or secondary amines, such as those described in U.S. Pat. Nos. 3,663,389; 3,984,299; 3,947,338; and 3,947,339. Often, these amine salt group-containing resins are used in combination with a blocked isocyanate curing agent. The isocyanate can be fully blocked, as described in U.S. Pat. No. 3,984,299, or the isocyanate can be partially blocked and reacted with the resin backbone, such as is described in U.S. Pat. No. 3,947,338. Also, one-component compositions as described in U.S. Pat. No. 4,134,866 and DE-OS No. 2,707,405 can be used as the film-forming resin. Besides the epoxy-amine reaction products, film-forming resins can also be selected from cationic acrylic resins, such as those described in U.S. Pat. Nos. 3,455,806 and 3,928,157.

Besides amine salt group-containing resins, quaternary ammonium salt group-containing resins can also be employed, such as those formed from reacting an organic polyepoxide with a tertiary amine salt as described in U.S. Pat. Nos. 3,962,165; 3,975,346; and 4,001,101. Examples of other cationic resins are ternary sulfonium salt group-containing resins and quaternary phosphonium salt-group containing resins, such as those described in U.S. Pat. Nos. 3,793,278 and 3,984,922, respectively. Also, film-forming resins which cure via transesterification, such as described in European Application No. 12463 can be used. Further, cationic compositions prepared from Mannich bases, such as described in U.S. Pat. No. 4,134,932, can be used.

In certain embodiments, the resins present in the electrodepositable composition are positively charged resins which contain primary and/or secondary amine groups, such as described in U.S. Pat. Nos. 3,663,389; 3,947,339; and 4,116,900. In U.S. Pat. No. 3,947,339, a polyketimine derivative of a polyamine, such as diethylenetriamine or triethylenetetraamine, is reacted with a polyepoxide. When the reaction product is neutralized with acid and dispersed in water, free primary amine groups are generated. Also, equivalent products are formed when polyepoxide is reacted with excess polyamines, such as diethylenetriamine and triethylenetetraamine, and the excess polyamine vacuum stripped from the reaction mixture, as described in U.S. Pat. Nos. 3,663,389 and 4,116,900.

In certain embodiments, the active hydrogen-containing ionic electrodepositable resin is present in the electrodepositable composition in an amount of 1 to 60 percent by weight, such as 5 to 25 percent by weight, based on total weight of the electrodeposition bath.

As indicated, the resinous phase of the electrodepositable composition often further comprises a curing agent adapted to react with the active hydrogen groups of the ionic electrodepositable resin. For example, both blocked organic polyisocyanate and aminoplast curing agents are suitable for use in the present invention, although blocked isocyanates are often preferred for cathodic electrodeposition.

Aminoplast resins, which are often the preferred curing agent for anionic electrodeposition, are the condensation products of amines or amides with aldehydes. Examples of suitable amine or amides are melamine, benzoguanamine, urea and similar compounds. Generally, the aldehyde employed is formaldehyde, although products can be made from other aldehydes, such as acetaldehyde and furfural. The condensation products contain methylol groups or similar alkylol groups depending on the particular aldehyde employed. Often, these methylol groups are etherified by reaction with an alcohol, such as a monohydric alcohol containing from 1 to 4 carbon atoms, such as methanol, ethanol, isopropanol, and n-butanol. Aminoplast resins are commercially available from American Cyanamid Co. under the trademark CYMEL and from Monsanto Chemical Co. under the trademark RESIMENE.

The aminoplast curing agents are often utilized in conjunction with the active hydrogen containing anionic electrodepositable resin in amounts ranging from 5 percent to 60 percent by weight, such as from 20 percent to 40 percent by weight, the percentages based on the total weight of the resin solids in the electrodepositable composition.

As indicated, blocked organic polyisocyanates are often used as the curing agent in cathodic electrodeposition compositions. The polyisocyanates can be fully blocked as described in U.S. Pat. No. 3,984,299 at col. 1, lines 1 to 68, col. 2, and col. 3, lines 1 to 15, or partially blocked and reacted with the polymer backbone as described in U.S. Pat. No. 3,947,338 at col. 2, lines 65 to 68, col. 3, and col. 4 lines 1 to 30, the cited portions of which being incorporated herein by reference. By "blocked" is meant that the isocyanate groups have been reacted with a compound so that the resultant blocked isocyanate group is stable to active hydrogens at ambient temperature but reactive with active hydrogens in the film forming polymer at elevated temperatures usually between 90° C. and 200° C.

Suitable polyisocyanates include aromatic and aliphatic polyisocyanates, including cycloaliphatic polyisocyanates and representative examples include diphenylmethane-4,4'-diisocyanate (MDI), 2,4- or 2,6-toluene diisocyanate (TDI), including mixtures thereof, p-phenylene diisocyanate, tetramethylene and hexamethylene diisocyanates, dicyclohexylmethane-4,4'-diisocyanate, isophorone diisocyanate, mixtures of phenylmethane-4,4'-diisocyanate and polymethylene polyphenylisocyanate. Higher polyisocyanates, such as triisocyanates can be used. An example would include triphenylmethane-4,4',4"-triisocyanate. Isocyanate ( )-prepolymers with polyols such as neopentyl glycol and trimethylolpropane and with polymeric polyols such as polycaprolactone diols and triols (NCO/OH equivalent ratio greater than 1) can also be used.

The polyisocyanate curing agents are typically utilized in conjunction with the active hydrogen containing cationic electrodepositable resin in amounts ranging from 5 percent to 60 percent by weight, such as from 20 percent to 50 percent by weight, the percentages based on the total weight of the resin solids of the electrodepositable composition.

The electrodepositable compositions described herein are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, often less than 0.15 micron.

The concentration of the resinous phase in the aqueous medium is often at least 1 percent by weight, such as from 2 to 60 percent by weight, based on total weight of the aqueous dispersion. When such compositions are in the form of resin concentrates, they generally have a resin solids content of 20 to 60 percent by weight based on weight of the aqueous dispersion.

The electrodepositable compositions described herein, in addition to the textured additives, are often supplied as two components: (1) a clear resin feed, which includes generally the active hydrogen-containing ionic electrodepositable resin, i.e., the main film-forming polymer, the curing agent, and any additional water-dispersible, non-pigmented components; and (2) a pigment paste, one or more colorants (described below), a water-dispersible grind resin which can be the same or different from the main-film forming polymer, and, optionally, additives such as wetting or dispersing aids. Electrodeposition bath components (1) and (2) are dispersed in an aqueous medium which comprises water and, usually, coalescing solvents.

As aforementioned, besides water, the aqueous medium may contain a coalescing solvent. Useful coalescing solvents are often hydrocarbons, alcohols, esters, ethers and ketones. The preferred coalescing solvents are often alcohols, polyols and ketones. Specific coalescing solvents include isopropanol, butanol, 2-ethylhexanol, isophorone, 2-methoxypentanone, ethylene and propylene glycol and the monoethyl monobutyl and monohexyl ethers of ethylene glycol. The amount of coalescing solvent is generally between 0.01 and 25 percent, such as from 0.05 to 5 percent by weight based on total weight of the aqueous medium.

In addition, a colorant and, if desired, various additives such as surfactants, wetting agents or catalyst can be included in the coating composition comprising a film-forming resin. As used herein, the term "colorant" means any substance that imparts color and/or other opacity and/or other visual effect to the composition. The colorant can be added to the composition in any suitable form, such as discrete particles, dispersions, solutions and/or flakes. A single colorant or a mixture of two or more colorants can be used.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as phthalo green or blue, iron oxide, bismuth vanadate, anthraquinone, perylene, aluminum and quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, nanoparticle dispersions. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in United States Patent Application Publication 2005-0287348 A1, filed Jun. 24, 2004, U.S. Provisional Application No. 60/482,167 filed Jun. 24, 2003, and U.S. patent application Ser. No. 11/337,062, filed Jan. 20, 2006, which is also incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. In certain embodiments, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain embodiments, a photosensitive composition and/or photochromic composition, which reversibly alters its color when exposed to one or more light sources, can be used. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In certain embodiments, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

In certain embodiments, the photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with certain embodiments of the present invention, have minimal migration out of the coating. Example photosensitive compositions and/or photochromic compositions and methods for making them are identified in U.S. application Ser. No. 10/892,919 filed Jul. 16, 2004, incorporated herein by reference.

In general, the colorant can be present in the coating composition in any amount sufficient to impart the desired visual and/or color effect. The colorant may comprise from 1 to 65 weight percent, such as from 3 to 40 weight percent or 5 to 35 weight percent, with weight percent based on the total weight of the composition.

In certain other embodiments, as noted above, it may also be desirable that the cured electrodepositable film has a low gloss finish on each of the visible surfaces in addition to the desired degree of texture as noted above. In certain of these embodiments, the cured electrodepositable film exhibits a 60° gloss of 3 or less on one more surfaces. To achieve this desired gloss, in certain embodiments, the electrodepositable coating composition may also, in addition to the textured additive and film forming polymer, comprise a flatting resinous dispersion. While not wishing to be bound by a single theory, the flatting agent dispersion is believed to provide a degree of incompatibility with the film forming polymer of the electrodepositable coating composition to induce flatting in the electrocoat formulation by formation of domains.

Suitable flatting agent dispersions include, but are not limited to, flatting resinous dispersions such as those described in U.S. patent application Ser. No. 13/005,569 to Valko et. al., filed on Jan. 13, 2011 and assigned to PPG Industries Ohio, Inc., the entirety of which being herein incorporated by reference.

The amount of flatting resinous dispersion included in the electrodepositable composition is ultimately determined by the degree of flatting desired, and may range from 1 to 40 or more weight percent of the total weight of the electrodepositable composition, based on resin solids. In certain embodiments, for example, a 60° gloss reading of 3 or less was achieved in certain embodiments utilizing 20 weight percent of the flatting resinous dispersion in an electrodepositable composition at conventional film builds.

EXAMPLES

In the examples provided below, an electrodepositable coating composition with and without a flatting agent dispersion was prepared and evaluated with varying levels and sizes of textured additives.

Preparation of Pigment Paste

First, a Pigment Paste for use in the examples was prepared. Its composition is shown in Table 1:

TABLE 1

| # | Material | Weight |
|---|----------|--------|
| 1 | Cationic grind vehicle[1] | 876.4 |
| 2 | Deionized water | 1,589.3 |
| 3 | Carbon black pigment[2] | 54.9 |
| 4 | Sunfast blue pigment[3] | 27.5 |
| 5 | $TiO_2$[4] | 383.3 |
| 6 | Yellow iron oxide pigment[5] | 1,013.7 |
| 7 | Deionized water | 54.9 |
| | Total | 4000 |

[1]Cationic grind resin produced in accordance with U.S. Pat. No. 4,007,154 to Schimmel et al., and assigned to PPG Industries, Inc.
[2]Printex 200 carbon black beads available from Evonik Degussa
[3]SunFast phthaloblue pigment available from Sun Chemical
[4]Tiona RCL-9 TiO2 pigment available from Milllennium Inorganics
[5]Lemon yellow iron oxide pigment available from Hoover Color Preparation of Cationic Electrodepositable Coating Composition With and Without Flatting Agent Dispersion and Without Texture Additives (Paints 1 and 2)

A cationic electrodeposition coating composition, was prepared by charging resin blend #1 (a cationic resin blend commercially available as CR935 from PPG, Industries, Inc.) and pre-dispersing it in deionized water.

Next, a flatting agent dispersion (as prepared in accordance with Example 1, Part A from U.S. patent application Ser. No. 13/005,569, filed Jan. 11, 2011) was added to the resin blend and stifled until the composition was uniform.

Next, resin blend #2 (a cationic resin blend commercially available as CA 147 from PPG, Industries, Inc.) was added under agitation and stirred until uniform to create a resin blend.

Separately, the pigment paste from Part 1 above was pre-dispersed in a separate metal container using a Cowles blade. After stirring for 15 minutes, deionized water is slowly added to create a uniformed, diluted, low viscosity paste blend. The pigment paste was then added to the resin blend under agitation and stirred until the composition was uniform.

The Pigment to Binder Ratio ("P/B") of the paint was maintained at either 0.25 or 0.35 by varying the amount of pigment paste in the resultant cationic electrodeposition coating composition.

Additional deionized water was optionally added to adjust the total solids weight of the electrodepositable coating compositions to between 15 and 20% solids. The resultant paint is hereinafter referred to as Paint 1.

A second cationic coating composition was prepared in a similar manner as described above, but without the flatting agent dispersion. This is hereinafter referred to as Paint 2.

Example 1

Evaluation of Texture Additives in Paint 1

Next, two texture additives (S60H ZEEOSPHERES™ ceramic microspheres commercially available from 3M; Recycled rubber (mesh 325) from Lehigh Technologies) were added at various loading levels to Paint 1 having either a 0.25 or 0.35 P/B and stirred in using a Cowles blade. The resultant mixture with the texture additives was then adjusted to either 15 or 20 percent solids.

Flat panels and L panels (B-952 P90 phosphated panels available from ACT) were coated with the electrodepositable coating compositions as described below and cured for 30 minutes at 400° F. (205° C.).

The cured panels were then evaluated for 60° gloss and degree of texture using the Taylor Hobson Surtronic 25™ compact surface texture measuring instrument. The results are summarized in Table 2:

TABLE 2

Design varying bath P/B, bath TS, level of S60HS ZEEOSPHERES ™ ceramic microspheres and recycled rubber 325 mesh

| Composition | bath P/B | bath TS | level of S60HS (30μ) | level of rubber 325 (44μ) | Flat panel (4" × 6") 60° gloss | "L" panel-horizontal side 60° gloss/profilometer |
|---|---|---|---|---|---|---|
| Paint 1 with S60HS ZEEOSPHERES ™ ceramic microspheres and Recycled rubber mesh 325 | 0.25/1.0 | 15% | 5% | 2% | 3.0 | Topside: 6.4/220 μ-in<br>Bottomside: 0.6/360 μ-in |
| Paint 1 with S60HS ZEEOSPHERES ™ ceramic microspheres and Recycled rubber mesh 325 | 0.35/1.0 | 15% | 5% | 2% | 0.4 | Topside: 1.0/470 μ-in<br>Bottomside: 0.4/500 μ-in |
| Paint 1 with S60HS ZEEOSPHERES ™ ceramic microspheres and Recycled rubber mesh 325 | 0.35/1.0 | 15% | 5% | 2% | 1.3 | Topside: 1.0/350 μ-in<br>Bottomside: 0.4/380 μ-in |
| Paint 1 with S60HS ZEEOSPHERES ™ ceramic microspheres and Recycled rubber mesh 325 | 0.25/1.0 | 15% | 10% | 2% | 1.1 | Topside: 1.7/410 μ-in<br>Bottomside: 0.3/740 μ-in |
| Paint 1 with S60HS ZEEOSPHERES ™ ceramic microspheres and Recycled rubber mesh 325 | 0.35/1.0 | 15% | 10% | 2% | 0.9 | Topside: 1.1/650 μ-in<br>Bottomside: 0.9/1160 μ-in |
| Paint 1 with S60HS ZEEOSPHERES ™ ceramic microspheres and Recycled rubber mesh 325 | 0.25/1.0 | 20% | 10% | 2% | 0.6 | Topside: 1.7/570 μ-in<br>Bottomside: 2.0/240 μ-in |

Example 2

Evaluation of Individual Texture Additives at Various Sizes in Paint 1

Next, various sizes of three different texture additives (S60H ZEEOSPHERES™ ceramic microspheres, SIC 280 green microgrit, and Vestosint 2161 nylon) were added to Paint 1 at 5% by weight based on the weight of the pigment paste, and stirred in using a Cowles blade.

Flat panels and L panels (B-952 P90 phosphated panels available from ACT) were coated with the electrodepositable coating compositions as described below and cured for 30 minutes at 400° F. (205° C.).

The cured panels were then evaluated for 60° gloss and degree of texture using the Taylor Hobson Surtronic 25™ compact surface texture measuring instrument. The cured panels were then evaluated for 60° gloss and degree of texture. The results are summarized in Table 3:

TABLE 3

Table 3 - Paint 1 with various "texture" additives/rubbers and various sized "texture" additives/rubbers

| "Texture" additive | level | Rubber type | level | Initial 60° gloss (flat panel) | WOM-700 hrs 60°gloss/ΔE (flat panel) | "L" panel-horizontal side 60° gloss/Δ profilometer |
|---|---|---|---|---|---|---|
| S60HS ZEEOSPHERES ™ ceramic microspheres | 5% on paste | 325 mesh (44μ) | 2% on paste | 0.3 | 0.1/5.34 | Topside: 0.5/480 μ-in. Bottomside: 0.3/350 μ-in. |
| S60HS ZEEOSPHERES ™ ceramic microspheres | 5% on paste | 200 mesh (74μ) | 2% on paste | 0.3 | 0.2/2.06 | Topside: 0.8/340 μ-in. Bottomside: 0.4/390 μ-in. |
| S60HS ZEEOSPHERES ™ ceramic microspheres | 5% on paste | 140 mesh (105μ) | 2% on paste | 0.4 | 0.3/3.73 | Topside: 0.5/380 μ-in. Bottomside: 0.3/350 μ-in. |
| SIC 280 green microgrit | 5% on paste | 325 mesh (44μ) | 2% on paste | 0.4 | 0.1/5.82 | Topside: 0.1/1020 μ-in. Bottomside: 0.9/260 μ-in. |
| SIC 280 green microgrit | 5% on paste | 200 mesh (74μ) | 2% on paste | 0.2 | 0.1/4.10. | Topside: 0.0/960 μ-in. Bottomside: 1.3/200 μ-in. |
| SIC 280 green microgrit | 5% on paste | 140 mesh (105μ) | 2% on paste | 0.2 | 0.2/5.06 | Topside: 0.1/890 μ-in. Bottomside: 1.1/210 μ-in. |
| Vestosint 2161 (nylon) | 5% on paste | 325 mesh (44μ) | 2% on paste | 0.4 | 0.2/3.67 | Topside: 0.3/400 μ-in. Bottomside: 0.8/260 μ-in. |
| Vestosint 2161 (nylon) | 5% on paste | 200 mesh (74μ) | 2% on paste | 0.3 | 0.2/3.60 | Topside: 0.5/410 μ-in. Bottomside: 1.2/220 μ-in. |
| Vestosint 2161 (nylon) | 5% on paste | 140 mesh (105μ) | 2% on paste | 0.5 | 0.3/3.60. | Topside: 0.8/410 μ-in. Bottomside: 1.3/250 μ-in. |
| — | — | — | — | 12 | 0.1/5.74 | — |

Example 3

Evaluation of Paints 1 and 2 With and Without Texture Additives

Flat panels and L panels (B-952 P90 phosphated panels available from ACT) were coated with either Paint 1 (with and without texture additives) or Paint 2 (without texture additives) in accordance with the coating parameters described below in Table 4 and cured for 30 minutes at 400° F. (205° C.). The cured panels were then evaluated for 60° gloss and degree of texture using the Taylor Hobson Surtronic 25™ compact surface texture measuring instrument. The results are summarized in Table 4:

TABLE 4

Examples for textured electrocoat

| Composition | Coating Temp. | Coating Voltage | Coating Current | Ramp Time | Coulombs | D.F.T | 60° Gloss | "L" Panel 60° Gloss/Profilometer |
|---|---|---|---|---|---|---|---|---|
| Paint 2 | 90° F. | 225 v | 0.5 a | 15" | 16 | 0.88 mil | 39.4 | Topside: 42/15 μ-in. Bottom side: 45/7 μ-in |
| Paint 1 With No Texture Additives | 90° F. | 225 v | 0.5 a | 15" | 16 | 0.97 mil | 1.4 | Topside: 1.1/231 μ-in. Bottom side: 1.5/194 μ-in |

TABLE 4-continued

Examples for textured electrocoat

| Composition | Coating Temp. | Coating Voltage | Coating Current | Ramp Time | Coulombs | D.F.T | 60° Gloss | "L" Panel 60° Gloss/Profilometer |
|---|---|---|---|---|---|---|---|---|
| Paint 1 With Texture Additives 5% S60HS* 2% Rubber Mesh 325* *both on paste weight | 90° F. | 225 v | 0.5 a | 15" | 18 | 0.90 mil | 1.4 | Topside: 1.2/680 µ-in. Bottom side: 1.8/413 µ-in |

Whereas particular embodiments of the invention have been described hereinabove for purposes of illustration, it will be evident to those skilled in the art that numerous variations of the details of the present invention may be made without departing from the invention as defined in the appended claims.

We claim:

1. An electrodepositable coating composition comprising:
   (a) a clear resin feed comprising:
      (1) a film forming resin; and
      (2) a curing agent; and
   (b) a pigment paste comprising:
      (1) a water dispersible grind resin; and
      (2) at least one pigment;
   (c) a textured additive present in an amount that is sufficient to provide an average degree of texture of at least 250µ-in on at least one coated surface of a cured electrodeposited film as measured by a profilometer, wherein the textured additive has a density (specific gravity) of no more than 4.5 g/cc and a melting point greater than a curing temperature of the electrodepositable coating composition; and
   (d) an aqueous medium.

2. The electrodepositable coating composition of claim 1, wherein said textured additive comprises nylon, ceramic microspheres, recycled vulcanized rubber, alumina, silicon carbide, or mixtures thereof.

3. The electrodepositable coating composition of claim 1, wherein said textured additive is introduced to the pigment paste and comprises from 0.5 to 20 weight percent of the total weight of said pigment paste.

4. The electrodepositable coating composition of claim 1 further comprising:
   (e) a flatting resinous dispersion.

5. The electrodepositable coating composition of claim 4, wherein said flatting resinous dispersion comprises between 1 and 40 weight percent of the total weight of the electrodepositable coating composition.

6. A method for forming a textured coating layer on a substrate comprising:
   electrodepositing the electrodepositable coating composition of claim 1 onto the substrate; and
   thermally curing said electrodepositable coating composition at said curing temperature to form the textured coating layer, wherein the textured coating layer has a degree of texture of at least 250µ-in on at least one coated surface as measured by a profilometer.

7. The method of claim 6, wherein said film forming resin comprises a cationic film forming resin.

8. The method of claim 6, wherein said textured additive comprises nylon, ceramic microspheres, recycled vulcanized rubber, alumina, silicon carbide, or mixtures thereof.

9. The method of claim 6, wherein said textured additive is added to said pigment paste and comprises from 0.5 to 20 weight percent of the total weight of said pigment paste.

10. The method of claim 6, wherein said textured additive is added to said pigment paste and comprises from 2 to 10 weight percent of the total weight of said pigment paste.

11. A coated substrate formed from said electrodepositable coating composition of claim 6.

12. The method of claim 6, wherein said electrodepositable coating composition further comprises a flatting resinous dispersion.

13. A coated substrate formed from the electrodepositable coating composition of claim 12.

14. The coated substrate of claim 13, wherein said textured coating layer has a 60 degree gloss reading measured at 3 or less.

* * * * *